United States Patent
Leinweber et al.

(10) Patent No.: US 7,026,363 B2
(45) Date of Patent: Apr. 11, 2006

(54) ALKOXYLATED POLYGLYCEROLS AND THEIR USE AS DEMULSIFIERS

(75) Inventors: Dirk Leinweber, Burghausen (DE); Franz Xaver Scherl, Burgkirchen (DE); Elisabeth Wasmund, Burgkirchen (DE); Heidi Grundner, Garching/Alz (DE)

(73) Assignee: Clariant GmbH, Frankfurt (DE)

( * ) Notice: Subject to any disclaimer, the term of this patent is extended or adjusted under 35 U.S.C. 154(b) by 240 days.

(21) Appl. No.: 10/467,395

(22) PCT Filed: Feb. 9, 2002

(86) PCT No.: PCT/EP02/01376

§ 371 (c)(1),
(2), (4) Date: Aug. 7, 2003

(87) PCT Pub. No.: WO02/066136

PCT Pub. Date: Aug. 29, 2002

(65) Prior Publication Data

US 2004/0072916 A1    Apr. 15, 2004

(30) Foreign Application Priority Data

Feb. 20, 2001  (DE) ................ 101 07 880

(51) Int. Cl.
*B01D 17/05*  (2006.01)
(52) U.S. Cl. ............ 516/143; 516/135; 516/139; 516/141; 210/708
(58) Field of Classification Search ........ 516/135, 516/139, 141, 143
See application file for complete search history.

(56) References Cited

U.S. PATENT DOCUMENTS

| | | | | |
|---|---|---|---|---|
| 2,499,365 A | 3/1950 | De Groote et al. | ......... | 252/338 |
| 2,552,528 A | 5/1951 | De Groote | ......... | 252/331 |
| 2,944,982 A | 7/1960 | De Groote et al. | ......... | 252/331 |
| 3,110,736 A | 11/1963 | De Groote et al. | ......... | 260/615 |
| 3,110,737 A | 11/1963 | De Groote et al. | ......... | 260/615 |
| 3,752,657 A | 8/1973 | Richardson | ......... | 44/72 |
| 3,954,808 A | 5/1976 | Elliott et al. | ......... | 260/343.2 |
| 4,061,684 A | 12/1977 | Helfert et al. | ......... | 260/615 B |
| 4,263,178 A | 4/1981 | Guth | ......... | 252/547 |
| 4,265,774 A * | 5/1981 | Langdon | ......... | 508/579 |
| 4,321,146 A * | 3/1982 | McCoy et al. | ......... | 210/708 |
| 4,342,657 A | 8/1982 | Blair, Jr. | ......... | 252/8.55 D |
| 4,414,035 A | 11/1983 | Newberry et al. | ......... | 134/3 |
| 4,431,565 A | 2/1984 | Billenstein et al. | ......... | 252/331 |
| 4,537,701 A | 8/1985 | Oppenlaender et al. | ......... | 252/344 |
| 5,021,498 A | 6/1991 | Stephenson et al. | ......... | 524/484 |
| 5,322,886 A | 6/1994 | Sauterey | ......... | 524/707 |
| 5,445,765 A | 8/1995 | Elfers et al. | ......... | 252/344 |
| 5,460,750 A | 10/1995 | Diaz-Arauzo | ......... | 252/331 |
| 5,494,607 A | 2/1996 | Manek et al. | ......... | 252/308 |
| 5,502,219 A | 3/1996 | Harris | ......... | 549/347 |
| 5,525,201 A | 6/1996 | Diaz-Arauzo et al. | ......... | 204/573 |
| 5,759,409 A | 6/1998 | Knauf et al. | ......... | 210/708 |
| 5,981,687 A * | 11/1999 | Breen et al. | ......... | 528/105 |
| 6,025,427 A | 2/2000 | Cabrera | ......... | 524/458 |
| 6,465,528 B1 | 10/2002 | Holtrup et al. | ......... | 516/184 |
| 2003/0235598 A1* | 12/2003 | Klug et al. | ......... | 424/401 |

FOREIGN PATENT DOCUMENTS

| | | |
|---|---|---|
| CA | 1 184 865 | 4/1985 |
| CA | 2029465 | 5/1991 |
| CA | 2075749 | 2/1993 |
| DE | 23 60 020 | 6/1975 |
| DE | 229 006 | 10/1985 |
| DE | 42 06 429 | 9/1993 |
| DE | 195 03 099 | 8/1995 |
| EP | 0 279 384 | 8/1988 |
| EP | 0 457 642 | 11/1991 |
| EP | 0 894 809 | 2/1999 |
| EP | 1 044 996 | 10/2000 |
| GB | 2 118 937 | 11/1983 |
| RU | 2089593 | * 9/1997 |
| RU | 2151780 | * 6/2000 |
| RU | 2152976 | * 7/2000 |
| RU | 2154090 | * 8/2000 |
| WO | WO 98/03243 | 1/1998 |

OTHER PUBLICATIONS

English abstract for DE 2360020, Jun. 12, 1975.
English abstract for DD 229006, Oct. 30, 1985.
English abstract for DE 4206429, Sep. 2, 1993.

(Continued)

*Primary Examiner*—Randy Gulakowski
*Assistant Examiner*—Timothy J. Kugel
(74) *Attorney, Agent, or Firm*—Richard P. Silverman

(57) ABSTRACT

The present invention relates to the use of alkoxylated polyglycerols preparable by polycondensation of glycerol and subsequent alkoxylation for demulsifying water-oil emulsions, in particular in the production of crude oil from crude oil/water emulsions. The invention provides for the use of alkoxylated polyglycerols with a molecular weight of from 250 to 100,000 units which comprise 2 to 100 glycerol units whose free OH groups are alkoxylated with C2–C4-alkylene oxide groups or a mixture of such alkylene oxide groups so that the alkoxylated polyglycerol has a degree of alkoxylation of from 1 to 100 alkylene oxide units per free OH group. The alkoxylated polyglycerols of the present invention are employed for demulsifying oil/water emulsions in amounts of from 0.0001 to 5% by weight, based on the oil content of the emulsion to be demulsified.

8 Claims, No Drawings

OTHER PUBLICATIONS

English abstract for DE 19503099, Aug. 17, 1992.
English abstract for WO 98/03243, Jan. 29, 1998.
English abstract for JP 10298210, Nov. 10, 1998.
Ryohei Ikeda et al. "A new crosslinkable polyphenol from a renewable resource", Macromol. Rapid Commun. 21, pp. 496-499, 2000.
A. Mahanwar et al., "Effect of cashew nut shell liquid (CNSL) on properties of phenolic resins", Journal of Applied Polymer Science, vol. 61, pp. 2107-2111, 1996.
Luiz Fernando et al., "Stabilization of asphaltenes by phenolic compunds extracted from cashew-nut shell liquid", Journal of Applied Polymer Science, vol. 73, pp. 23-34, 1999.
Peter A. Lovell et al., Title page and table of contents for "Emulsion Polymerization and Emulsion Polymers", John Wiley and Sons, 1997.
Chia-Lu Chang, et al., "Asphaltene Stabilization in Alkyl Solvents Using Oil-Soluble Amphiphiles", SPE paper No. 25185, 1993, pp. 339-349.
M.N. Bouts, et al., "An evaluation of new asphaltene inhibitors: laboratory study and field testing", J. Petroleum Tech., 47, Sep. 1995, pp. 782-787.

* cited by examiner

ALKOXYLATED POLYGLYCEROLS AND THEIR USE AS DEMULSIFIERS

The present invention relates to the use of alkoxylated polyglycerols preparable by polycondensation of glycerol and subsequent alkoxylation for demulsifying water-oil emulsions, in particular in the production of crude oil.

During its recovery, crude oil is produced as an emulsion with water. Before the crude oil is further processed, these crude oil emulsions must be demulsified into the oil and water constituents. For this purpose, use is generally made of petroleum demulsifiers. Petroleum demulsifiers are interface-active compounds which are able to effect the required separation of the emulsion constituents within a short time.

Disclosed petroleum demulsifiers are, in U.S. Pat. No. 321,146, alkylene oxide block copolymers and, in U.S. Pat. No. 5,445,765, alkoxylated polymines. These can be used as individual components, in mixtures with other demulsifiers, or else as crosslinked products. Crosslinkings are generally carried out by reactions of the individual demulsifier components with bifunctional compounds such as diepoxides or diisocyanates. Such crosslinked compounds are disclosed in U.S. Pat. Nos. 5,759,409 and 5,981,687.

The use of alkoxylated glycerol as demulsifying constituent in lubricating oils has been described in DD-229006. Here, glycerol is reacted with alkylene oxides either to give a block copolymer or a random copolymer.

Alkoxylated polyglycerols are known per se. They are described in the prior art for various applications. For example, in U.S. Pat. No. 5,502,219, alkoxylated polyglycerols were esterified in order to prepare a low-calorie substitute for plant oils. In U.S. Pat. No. 4,061,684, the alkoxylated polyglycerols were esterified and used as gels which swell in water. Alkoxylated polyglycerols which have been reacted with alpha-olefin epoxides act, according to WO-98/03243, as antifoams. The sulfation of alkoxylated polyglycerols leads to substances which are used in hair shampoos, as disclosed in U.S. Pat. No. 4,263,178. However, alkoxylated polyglycerols have still not been used as demulsifiers.

The various properties (e.g. asphaltene and paraffin content) and proportions of water in various crude oils make it imperative to further develop the existing petroleum demulsifiers. In particular, a low dosing rate of the demulsifier to be used as well as the relatively high effectiveness to be strived for is at the forefront from an economic and ecological point of view.

The object was thus to develop novel petroleum demulsifiers which are superior in their effect to the already known alkoxylated polyalkylene glycols or polymines, and can be used in an even lower concentration. Surprisingly, it has been found that alkoxylated polyglycerols exhibit an excellent effect as petroleum demulsifiers even at a very low concentration. The invention therefore provides for the use of alkoxylated polyglycerols with a molecular weight of from 250 to 100,000 units which comprise 2 to 100 glycerol units whose free OH groups are alkoxylated with $C_2$–$C_4$-alkylene oxide groups or a mixture of such alkylene oxide groups so that the alkoxylated polyglycerol has a degree of alkoxylation of from 1 to 100 alkylene oxide units per free OH group, for demulsifying oil/water emulsions in amounts of from 0.0001 to 5% by weight, based on the oil content of the emulsion to be demulsified.

These alkoxylated polyglycerols are obtainable from polyglycerols having 2 to 100 glycerol units by alkoxylation of the free OH groups with a $C_2$–$C_4$-alkylene oxide or a mixture of such alkylene oxides in molar excess, such that the alkoxylated polyglycerol has said degree of alkoxylation.

The preparation of polyglycerol is known in the prior art and takes place generally by acid- or alkali-catalyzed condensation of glycerol. The reaction temperature is generally between 150 and 300° C., preferably 200 to 250° C. The reaction is normally carried out at atmospheric pressure. Examples of catalyzing acids are HCl, $H_2SO_4$, sulfonic acids or $H_3PO_4$, and bases which may be mentioned are NaOH or KOH, which are used in amounts of from 0.1 to 50% by weight, based on the weight of the reaction mixture. The condensation generally requires 3 to 10 hours. Polyglycerols can be depicted by formula 1.

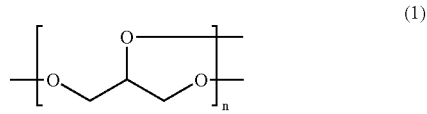

(1)

In formula 1, n is the degree of condensation, i.e. the number of glycerol units. n increases with increasing reaction time and is determined by means of the OH number.

The polyglycerols obtained from the condensation are then alkoxylated with one or more $C_2$–$C_4$-alkylene oxides, preferably ethylene oxide (EO) or propylene oxide (PO). The alkoxylating agent is used in molar excess. The alkoxylation takes place, as known in the prior art, by reaction of the polyglycerols with an alkylene oxide under an increased pressure of generally 1.1 to 20 bar at temperatures of from 50 to 200° C. The alkoxylation takes place on the free OH groups of the polyglycerols. The amount of alkylene oxide used is sufficient for the average degree of alkoxylation to be between 1 and 100 alkylene oxide units per free OH group. Average degree of alkoxylation is understood here as meaning the average number of alkoxy units which is positioned on each free OH group. It is preferably 2 to 70, in particular 5 to 50.

Preferably, the alkoxylation is carried out with a mixture of EO and PO. The ratio of EO to PO in the alkoxylated polyglycerol is preferably between 1:2 and 1:10.

The alkoxylated polyglycerol obtained following condensation and alkoxylation preferably has a molecular weight of from 500 to 50,000 units, preferably from 1,000 to 10,000 units.

The alkoxylated polyglycerols prepared by the described process can be depicted by the following structure (formula 2):

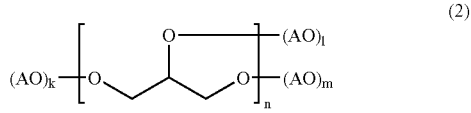

(2)

$(AO)_{k,l,m}O$ are the alkoxylated OH radicals in which AO is a $C_2$–$C_4$-alkylene oxide unit and k, l, m are the degrees of alkoxylation. n is the degree of condensation of the glycerol. n is preferably a number from 3 to 50, particularly preferably 4 to 30.

The present invention preferably provides for the use of the alkoxylated polyglycerol as demulsifiers for oil/water emulsions in the recovery of crude oil.

For use as crude oil demulsifiers, the alkoxylated polyglycerols are added to the water-oil emulsions, which preferably takes place in solution. Preferred solvents for the alkoxylated polyglycerols are paraffinic or aromatic solvents. The alkoxylated polyglycerols are used in amounts of from 0.0001 to 5% by weight, preferably 0.0005 to 2% by weight, in particular 0.0008 to 1% by weight and specifically 0.001 to 0.1% by weight, based on the oil content of the emulsion to be demulsified.

EXAMPLES

Example 1

Preparation of Pentadecaglycerol 100.0 g of glycerol and 3.7 g of NaOH (18% strength) were mixed in a 500 ml three-necked flask fitted with contact thermometer, stirrer and water separator. With stirring and nitrogen blanketing, the reaction mixture was heated rapidly to 240° C. At this temperature, the water of reaction was distilled off over 8 h. The product was evaporated to dryness on a rotary evaporator (yield: 67.3 g) and the molar mass was analyzed by GPC (with standard polyethylene glycol). The chain length n was determined via the OH number.

Example 2

Preparation of Decaglycerol 100.0 g of glycerol and 3.7 g of NaOH (18% strength) were mixed in a 500 ml three-necked flask fitted with contact thermometer, stirrer and water separator. With stirring and nitrogen blanketing, the reaction mixture was heated rapidly to 240° C. At this temperature, the water of reaction was distilled off over 5 h. The product was evaporated to dryness on a rotary evaporator (yield: 74.9 g) and analyzed by GPC. The chain length n was determined via the OH number.

Example 3

Preparation of Pentaeicosaglycerol 100.0 g of glycerol and 3.7 g of NaOH (18% strength) were mixed in a 500 ml three-necked flask fitted with contact thermometer, stirrer and water separator. With stirring and nitrogen blanketing, the reaction mixture was heated rapidly to 240° C. At this temperature, the water of reaction was distilled off over 12 h. The product was evaporated to dryness on a rotary evaporator (yield: 58.4 g) and analyzed by GPC. The chain length n was determined via the OH number.

Example 4

Pentacontanglycerol 100.0 g of glycerol and 3.7 g of NaOH (18% strength) were mixed in a 500 ml three-necked flask fitted with contact thermometer, stirrer and water separator. With stirring and nitrogen blanketing, the reaction mixture was heated rapidly to 240° C. At this temperature, the water of reaction was distilled off over 20 h. The product was evaporated to dryness on a rotary evaporator (yield: 54.9 g) and analyzed by GPC. The chain length n was determined via the OH number.

Alkoxylation of the Polyglycerols

Ethylene Oxide

The polyglycerols described above were introduced into a 1 l glass autoclave and the pressure in the autoclave was adjusted to about 0.2 bar above atmospheric pressure with nitrogen. Heating was slowly carried out to 140° C. and, after this temperature had been reached, the pressure was again adjusted to 0.2 bar above atmospheric pressure. Then, at 140° C., the desired amount of EQ was metered in, during which the pressure did not exceed 4.5 bar. When the addition of EO was complete, the mixture was left to after-react for a further 30 minutes at 140.degree. C.

Propylene Oxide

The polyglycerols described above were introduced into a 1 l glass autoclave and the pressure in the autoclave was adjusted to about 0.2 bar above atmospheric pressure with nitrogen. Heating was slowly carried out to 130° C. and, after this temperature had been reached, the pressure was again adjusted to 0.2 bar above atmospheric pressure. Then, at 130° C. , the desired amount of PO was metered in, during which the pressure did not exceed 4.0 bar. When the addition of PO was complete, the mixture was left to after-react for a further 30 minutes at 130°C.

The degree of alkoxylation was determined by means of $^{13}$C-NMR

Determination of the Demulsifying Effectiveness of Petroleum Demulsifiers

To determine the effectiveness of a demulsifier, the water separation from a crude oil emulsion per time, and also the dewatering and desalting of the oil were determined. For this, demulsifying glasses (tapered, graduated glass bottles with screw lids) were charged in each case with 100 ml of the crude oil emulsion, in each case a defined amount of the demulsifier was metered in just below the surface of the oil emulsion using a micropipette, and the demulsifier was mixed into the emulsion by intensive shaking. The demulsifying glasses were then placed in a conditioning bath (30° C. and 50° C.) and water separation was monitored.

During demulsification and after it had finished, samples were taken from the oil from the upper section of the demulsifying glass (so-called top oil), and the water content was determined in accordance with Karl Fischer and the salt content was determined conductometrically. In this way, it was possible to assess the novel demulsifiers according to water separation and also dewatering and desalting of the oil.

Demulsifying action of the demulsifiers described

| | |
|---|---|
| Origin of the crude oil emulsion: | Holzkirchen sonde 3, Germany |
| Water content of the emulsion: | 46% |
| Salt content of the emulsion: | 5% |
| Demulsification temperature: | 50° C. |

TABLE 1

Effectiveness of alkoxylated polyglycerols as demulsifiers

| Water separation [ml] per time [min] | Concentration [ppm] | Time/min | | | | | | | | | Water in the top oil [%] | Salt in the top oil [ppm] |
|---|---|---|---|---|---|---|---|---|---|---|---|---|
| | | 5 | 10 | 20 | 30 | 45 | 60 | 90 | 120 | 180 | | |
| Product from 1 + 40 mol of PO | 30 | 3 | 15 | 30 | 33 | 41 | 45 | 46 | 46 | 46 | 0.35 | 64 |
| Product from 1 + 50 mol of PO | 30 | 1 | 17 | 24 | 29 | 37 | 46 | 46 | 46 | 46 | 0.24 | 52 |
| Product from 2 + 40 mol of PO | 30 | 2 | 9 | 16 | 23 | 28 | 40 | 45 | 46 | 46 | 0.32 | 43 |
| Product from 2 + 50 mol of PO | 30 | 1 | 10 | 19 | 32 | 40 | 45 | 46 | 46 | 46 | 0.41 | 81 |
| Product from 3 + 40 mol of PO + 5 mol EO | 30 | 4 | 15 | 27 | 39 | 44 | 44 | 45 | 45 | 46 | 0.38 | 71 |
| Product from 3 + 50 mol of PO + 8 mol EO | 30 | 3 | 12 | 24 | 36 | 42 | 44 | 45 | 44 | 46 | 0.47 | 88 |
| Product from 4 + 40 mol of PO + 7 mol of EO | 30 | 2 | 14 | 27 | 35 | 43 | 43 | 45 | 45 | 46 | 0.26 | 33 |
| Product from 4 + 50 mol of PO + 10 mol of EO | 30 | 1 | 9 | 16 | 22 | 29 | 38 | 44 | 44 | 46 | 0.31 | 32 |
| Standard: Dissolvan 4738 | 80 | 1 | 3 | 10 | 15 | 21 | 30 | 39 | 39 | 40 | 0.95 | 104 |

What is claimed is:

1. A method for demulsifying an oil/water emulsion, said method comprising adding an additive to the oil/water emulsion in an amount of from 0.0001 to 5% by weight, based on an oil content of the oil/water emulsion, wherein the additive comprises an alkoxylated polyglycerol with a molecular weight of from 250 to 100,000 units which comprise 2 to 100 glycerol units whose free OH groups are alkoxylated with ethylene oxide and propylene oxide in the ratio of from 1:2 to 1:10 so that the alkoxylated polyglycerol has a degree of alkoxylation of from 1 to 100 alkylene oxide units per free OH group.

2. The method of claim 1, in which the alkoxylated polyglycerols have between 3 and 50 glycerol units.

3. The method of claim 1, where the alkoxylated polyglycerols have a molecular weight of from 500 to 50,000 units.

4. The method of claim 1, in which the degree of alkoxylation is between 1 and 70 alkylene oxide units per free OH group.

5. The method of claim 1 wherein the oil/water mixture is a mixture comprising crude oil and water.

6. The method of claim 1 wherein the additive is added in the amount ranging from 0.001 to 1 percent by weight, based on the oil content of the oil/water emulsion.

7. The method of claim 1 wherein the alkoxylated polyglycerols have the structure of formula (2):

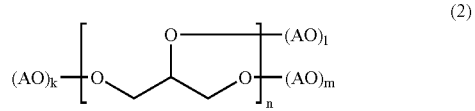

(2)

wherein $(AO)k,l,mO$ are the alkoxylated OH radicals in which AO is a C2–C4-alkylene oxide unit, wherein AO comprises ethylene oxide and propylene oxide in a ratio of from 1:2 to 1:10 and k, l, m are individually the degrees of alkoxylation of from 1 to 100 and n is the degree of condensation of the glycerol ranging from 3 to 50.

8. The method of claim 7 wherein n ranges from 4 to 30.

* * * * *